US006337352B1

(12) United States Patent
Milius

(10) Patent No.: US 6,337,352 B1
(45) Date of Patent: *Jan. 8, 2002

(54) ANTI-FOAMING COMPOSITION

(75) Inventor: Alain Milius, Nice (FR)

(73) Assignee: Societe d'Exploitation de Produits pour les Industries Chimiques Seppic, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/467,077

(22) Filed: Dec. 20, 1999

Related U.S. Application Data

(63) Continuation-in-part of application No. 08/860,101, filed as application No. PCT/FR96/00600 on Apr. 19, 1996, now Pat. No. 6,015,839.

(30) Foreign Application Priority Data

Apr. 21, 1995 (FR) ........................................... 95 04827

(51) Int. Cl.[7] ........................... B01D 19/04; C11D 1/72

(52) U.S. Cl. ....................... 516/134; 516/204; 510/235; 510/470; 510/535

(58) Field of Search ................................ 516/134, 204; 510/235, 470, 535

(56) References Cited

U.S. PATENT DOCUMENTS

| | | | | | |
|---|---|---|---|---|---|
| 3,567,784 | A | | 3/1971 | Tsatsos et al. | 510/506 |
| 3,752,857 | A | | 8/1973 | Milligan | 510/506 |
| 3,956,401 | A | | 5/1976 | Scardera et al. | 516/76 |
| 4,070,298 | A | | 1/1978 | Scardera et al. | 516/134 |
| 4,134,854 | A | | 1/1979 | Milligan | 516/204 |
| 4,240,921 | A | | 12/1980 | Kaniecki | 510/470 |
| 4,836,951 | A | | 6/1989 | Totten et al. | 510/220 |
| 4,923,976 | A | | 5/1990 | Arnaudis | 536/18.6 |
| 5,154,850 | A | | 10/1992 | Deguchi et al. | 510/420 |
| 5,205,959 | A | | 4/1993 | Schmid et al. | 516/134 |
| 5,556,573 | A | | 9/1996 | Weuthen et al. | 510/470 |
| 5,681,949 | A | | 10/1997 | Johansson et al. | 536/18.6 |
| 5,928,993 | A | * | 7/1999 | Johansson | 504/116 |
| 6,015,839 | A | * | 1/2000 | Milius | 516/134 |
| 6,140,296 | A | * | 10/2000 | Ishii et al. | 510/535 |
| 6,140,297 | A | * | 10/2000 | Ishii et al. | 510/535 |

FOREIGN PATENT DOCUMENTS

| | | | |
|---|---|---|---|
| DE | 40 09 533 | | 9/1991 |
| DE | 43 19 700 | | 12/1994 |
| DE | 44 04 199 | | 8/1995 |
| EP | 0 077 167 | | 4/1983 |
| EP | 0 408 965 | | 1/1991 |
| WO | WO 91/03538 | * | 3/1991 |
| WO | WO 94/21655 | | 9/1994 |

OTHER PUBLICATIONS

Database DWPI on East, Week 9140, London: Derwent Publications, Ldt. AN 1991–289038, DE 40 09 533 A (Henkel KGAA), abstract, 1991.*

* cited by examiner

*Primary Examiner*—Daniel S. Metzmaier
(74) *Attorney, Agent, or Firm*—Young & Thompson

(57) ABSTRACT

A method of improving the solubility of a defoaming non-ionic compound in an alkaline aqueous medium includes adding to the aqueous medium a defoaming compound an effective quantity of a compound having the formula: $ROZ_n$ in which R represents a 2-ethyl hexyl radical, Z is a sugar residue, and n is between 1.1 and 2.

10 Claims, No Drawings

ANTI-FOAMING COMPOSITION

This application is a continuation-in-part of U.S. application Ser. No. 08/860,101, filed Jul. 3, 1997, now U.S. Pat. No. 6,015,839, which was the National Stage of International Application PCT/FR96/00600, filed on Apr. 19, 1996.

BACKGROUND OF THE INVENTION

The present invention relates to anti-foaming compositions comprising at least one non ionic defoaming surfactant as well as a solubilizer.

DESCRIPTION OF THE RELATED ART

Certain cleaning compositions in industrial cleaning operations, such as the cleaning of bottles or the washing of floors, may lead to the formation of a large amount of foam. This is due in particular to the presence of food soiling or adhesive residues present on the bottles. In order to reduce, or even prevent, the formation of this foam, it is known to add one or more defoaming surfactants to the cleaning composition. Examples of such compositions are disclosed in U.S. Pat. No. 4,070,298. These defoaming surfactants are generally of the non ionic type. However, these defoaming surfactants are of limited use on account of their low solubility in very concentrated alkaline cleaning compositions, which may comprise up to 50% by weight of sodium hydroxide or of potassium hydroxide. Under these conditions, the said defoaming surfactants are sparingly soluble. In order to avoid having to decrease the concentration of alkaline agents to the detriment of the cleaning performance, it is known to combine the defoaming surfactant with agents which make them more soluble, such as cumenesulfonates and xylenesulfonates or organic solvents.

Alkyl polyglycosides have already been described as making non ionic defoaming surfactants more soluble. Alkyl polyglycosides are well-known non ionic surfactants. Their manufacturing process is described, for example, in patent application EP-A-0 077 167. European patent application EP-A-0 489 777 (U.S. Pat. No. 5,025,959) describes an alkali stable foam inhibitor composition comprising polyethylene glycol ethers derived from $C_{16}$ to $C_{20}$ even-numbered alkanols, and alkyl polyglycosides, whose alkyl chain comprises from 6 to 12 carbon atoms. On lines 9 to 30 of column 2 of U.S. Pat. No. 5,025,959, it is taught that strongly cleaning formulations consisting in end-capped fatty alcohol glycol ethers with $C_8$ to $C_{12}$ polyglucoside are foaming too vigorously particularly through the presence of the alkyl glucoside. Until now, the only alkyl polyglycoside compound which is marketed to date, as solubilizing agents for defoaming non ionic surfactants are 50/50 mixtures (by weight) of alkyl polyglycosides having, respectively, an alkyl chain containing 8 carbon atoms and an alkyl chain containing 10 carbon atoms. This type of solubilizing agents, is marketed by the company Union Carbide under the brand name Triton™ BG 10.Alkyl polyglucoside have also been disclosed in U.S. Pat. No. 5,556,573, as a crystallization moderators of fatty alkyl polyglucosides.

SUMMARY OF THE INVENTION

A first subject of the present invention consists of an anti-foaming composition comprising a non ionic surfactant and specific alkyl polyglycosides, these compounds making soluble said defoaming surfactants.

According to another aspect, the invention also relates to a cleaning composition comprising an anti-foaming composition based on (i) a defoaming non ionic surfactant and (ii) the said specific alkyl polyglycoside, and to a method for improving the solubility of a defoaming non ionic compound in an alkaline aqueous medium, comprising adding in said medium together with said defoaming non ionic surfactant, an efficient quantity of the said specific alkyl polyglycoside.

DESCRIPTION OF THE PREFERRED EMBODIMENTS

The invention thus relates to an anti-foaming composition comprising at least one defoaming non ionic surfactant and at least one alkyl polyglycoside of formula (I):

$$R(O)Z_n \quad (I)$$

in which:

R represents a 2-ethyl hexyl radical,

Z is a sugar residue, and n is between 1 and 5.

It has been observed that such a (2-ethyl hexyl) polyglycoside makes it surprisingly possible, to increase the solubility on the non ionic surfactant in an alkaline medium and therefore makes it possible to reinforce the anti-foaming effect of said non ionic surfactant within said alkaline medium, whereas it is well known, that the compound according to formula (I) has no anti foaming action when it is taken alone. There is thus genuine synergism between the latter and the compound of formula (I).

The residue Z may be chosen from the residues of the following compounds: glucose, dextrose, sucrose, fructose, galactose, maltose, maltotriose, lactose, celobiose, mannose, ribose, dextran, tallose, xylose, and levoglucosan.

Among these compounds, dextrose, fructose and maltose are preferred, glucose being most particularly preferred.

According to an advantageous aspect of the invention, n is between 1.1 and 2.

The non ionic defoaming surfactants according to the invention, are generally chosen from those comprising one or more groups chosen from mono ethoxylated (EO) or poly ethoxylated (PEO) groups, of formula $(CH_2CH_2O)_n$, and mono propoxylated (PO) or poly propoxylated (PPO) groups, of formulae $[CH(CH_3)—CH_2O]_m$ or $[CH_2—CH(CH_3)—O]_m$, wherein n and m, which may be identical or different, are between 1 and 50. A non ionic defoaming surfactant according to the invention may contain one or more ethoxylated or propoxylated groups, these groups being distributed in a random or block manner. These ethoxylated or propoxylated groups may or may not be blocked with a $C_4$–$C_8$ alkyl radical, preferably a butyl radical, with a benzyl radical or with butylene oxide. The term "blocked" is understood to mean that these groups contain, at the end of the chain, not a hydrogen atom but a radical as mentioned above.

Non ionic defoaming surfactants which are preferred in the context of the present invention may be represented by the general formula:

$$R—X—[(PO)_d—EO)_a—Y]_n$$

in which:

- R represents a hydrophobic group preferably chosen from linear or branched alkyl groups having from 6 to 14 carbon atoms;
- X represents a nitrogen atom or an oxygen atom;
- EO represents an ethylene oxide group ($CH_2—CH_2O$);
- PO represents a propylene oxide group $CH_2—CH(CH_3)—O$ or $CH(CH_3)—CH_2—O$;
- a represents an integer between 1 and 50;
- d represents an integer between 0 and 50;
- Y represents a hydrogen atom or a blocking group chosen from an alkyl radical having from 4 to 8 carbon atoms, preferably a butyl radical, a benzyl radical, a butylene oxide group;

or alternatively a group $(PO)_bH$ or $[(PO)_b—(EO)_cH]$, in which b and c independently represent an integer between 1 and 50; and n is equal to 1 when X represents an oxygen atom and n is equal to 2 when X represents a nitrogen atom.

The non ionic defoaming surfactants that are particularly preferred in the context of the present invention are chosen from the group consisting of polyethoxylated amines, polyethoxylated and polypropoxylated amines, polyethoxylated alcohols blocked with a $C_4$–$C_8$ radical, preferably blocked with a butyl radical, or alternatively blocked with a benzyl radical or butylene oxide, and polyethoxylated and/or polypropoxylated alcohols.

The non ionic defoaming surfactants which are most particularly preferred are those of formula (II):

(II)

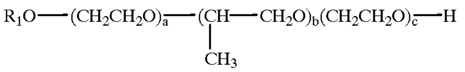

in which:

$R_1$ is a linear or branched alkyl radical comprising 6 to 14 carbon atoms, preferably 8 to 10 carbon atoms;

a, b and c, which may be identical or different, are integers between 1 and 10.

An anti-foaming composition according to the invention may be in concentrated or dilute, ready-to-use form. When it is in concentrated form, it may comprise from 10 to 50%, preferably 20% to 50% by weight of at least one compound of formula (I) and from 20% to 70%, preferably 20% to 50% by weight of at least one non ionic defoaming surfactant. When it is in dilute form, it may comprise from 0.004% to 10% by weight of at least one compound of formula (I) and from 0.004% to 20%, preferably 0.004% to 10% by weight of at least one non ionic defoaming surfactant. This anti-foaming composition generally comprises a compound of formula (I) and a non ionic defoaming surfactant in a weight ratio of between 1/10 and 10/1, preferably between 1/5 and 5/1 and most preferably around 1.

According to another aspect of the invention, it relates to the use of an anti-foaming composition as defined above as an anti-foaming agent.

According to yet another aspect of the invention, it relates to the use of an alkyl polyglycoside of above mentioned formula (I) as a solubilizing agent for a non ionic defoaming surfactant.

According to yet another aspect of the invention, it relates to cleaning compositions comprising an anti-foaming composition as described above. This cleaning composition according to the invention usually comprises from 2 to 50% by weight of one or more alkaline agents. The alkaline agent used in these compositions is usually sodium hydroxide or potassium hydroxide. The cleaning compositions according to the invention may contain an anti-foaming composition content which is such that the concentration of non ionic defoaming surfactant in the said cleaning composition is between 0.001 and 2% by weight.

According to a last aspect of the invention, it relates to a method for improving the solubility of a defoaming non ionic compound in an alkaline aqueous medium, including the following steps:

a) preparing a mixture of at least one defoaming non-ionic surfactant with at least one compound of the formula (I)

b) mixing said mixture within an alkaline aqueous medium.

The examples which follow serve to illustrate the present invention.

EXAMPLE 1

The defoaming power of various alkyl polyglucosides (APG) of variable alkyl chain length were tested according to the following procedure:

(i) different solutions comprising the following compounds (% by weight) were prepared:

defoaming surfactant (1): 0.006

APG: 0.006 alkaline base at a concentration of 10% (2): 3

Régilait® milk powder at a 10% dispersion: 7.5 deionized water: qsp 100

(1): alcohol of above mentioned formula (II) where a=3, b=4 and c=2, marketed by the company S.E.P.P.I.C., under the brand name Simulsol™ NW 342

(2): alkaline base comprising (% by weight):

sodium tripolyphosphate: 3.5 sodium metasilicate: $5H_2O$ 4.2 anhydrous sodium carbonate: 2.3 deionized water: qsp 100

(ii) The solution was subjected to gentle rotary stirring for three minutes and the height of the foam formed was measured (in mm), after leaving to stand for 5 seconds. The stirring was such that a similar solution, but comprising neither defoaming surfactants nor APG, formed a foam with a height of 30 mm.

The results obtained are featured in Table I.

TABLE I

| APG (alkyl chain) | Foam height (mm) |
|---|---|
| n-hexyl | 10.5 |
| n-octyl | 12.5 |
| 2-ethyl hexyl | 10 |
| n-octyl + n-decyl (50/50 mixture by weight) | 15.5 |

These results show that compositions according to the invention comprising an APG whose alkyl chain is a 2-ethyl hexyl radical makes it possible to obtain a higher defoaming power than that obtained with a 50/50 mixture of $C_8$–$C_{10}$ APG or with APGs comprising an n-octyl or n-hexyl radical.

It may be noted that a composition comprising no APG but only the defoaming surfactant produces a foam height of 14 mm.

EXAMPLE 2

The solubilizing power of various APGs with respect to Simulsol™ NW 342 was tested according to the following procedure:

100 g of a solution comprising the following compounds (in g) was prepared:

Simulsol™ NW 342: 0.1

NaOH: 5

$H_2O$: qsp 100 the solution obtained is two-phase and cloudy;

various solubilizing agents consisting of APGs containing different alkyl chain lengths, or standard solubilizing agents, namely ammonium xylenesulfonate and ammonium cumenesulfonate, are poured into this two-phase solution;

the introduction of the stabilizing agent is interrupted as soon as the two-phase solution has become totally clear and monophasic;

the weight of solubilizing agent required to obtain a clear solution represents its solubilizing power.

The results obtained are featured in Table II below:

TABLE II

| Solubilizing agent | Weight (in g) of solubilizing agent to obtain a clear solution |
|---|---|
| APG containing n-hexyl chain | 3.5 |
| APG containing 2-ethyl hexyl chain | 0.96 |
| Ammonium xylenesulfonate | 1.6 |
| Ammonium cumenesulfonate | 3 |

These results show that an alkyl polyglucoside comprising an n-hexyl chain has a low solubilizing power, in any case lower than that of a standard solubilizing agent of the cumene and xylene type. On the other hand, an alkyl polyglucoside containing a 2-ethyl hexyl chain is of good solubilizing power.

What is claimed is:

1. A method for improving the solubility of a defoaming non-ionic compound in an alkaline aqueous medium, comprising the step of:

adding in said medium together with said defoaming compound, a compound having the formula (I):

$$R(O)Z_n \qquad (I)$$

in which:

R represents a 2-ethyl hexyl radical,

Z is a sugar residue, and n is between 1.1 and 2, wherein the non-ionic defoaming compound is a compound of formula (II):

$$R_1O-(CH_2CH_2O)_a-(\underset{\displaystyle CH_3}{\underset{|}{CH}}-CH_2O)_b(CH_2CH_2O)_c-H \qquad (II)$$

in which:

R1 is a linear or branched alkyl radical comprising 6 to 14 carbon atoms, a, b and c, which may be identical or different, are integers between 1 and 10, and the weight ratio between the compound of formula (I) and the non-ionic defoaming compound of formula (II) is approximately 1.

2. The method of claim 1, wherein R1 is a linear or branched alkyl radical comprising 8 to 10 carbon atoms.

3. The method of claim 1, wherein the alkaline aqueous medium contains from 2 to 50% by weight of an alkaline agent.

4. The method of claim 1, wherein the alkaline aqueous medium, contains from 0.001% to 2% by weight of a non-ionic defoaming surfactant.

5. The method of claim 1, wherein the alkaline aqueous medium contains detergents.

6. The method of claim 1, including the following further steps of:

a) preparing a mixture of at least one defoaming non-ionic surfactant of the formula (II) with at least one compound of the formula (I), wherein the ratio between the compound of formula (I) and the non-ionic defoaming surfactant of the formula (II) is approximately 1; and b) mixing said mixture within an alkaline aqueous medium in a quantity to obtain a final concentration of the non-ionic defoaming surfactant between 0.001% and 2% by weight.

7. A concentrated ready-to-use anti-foaming composition consisting essentially of:

from 20 to 50% by weight of one or various compounds of formula (I); and from 20% to 50% by weight of one or of a mixture of defoaming non-ionic surfactant of formula (II), wherein the weight ratio between the compound of formula (I) and the non-ionic defoaming surfactant of formula (II) is approximately 1, formula (I) is given as:

$$R(O)Z_n \qquad (I)$$

in which:

R represents a 2-ethyl hexyl radical,

Z is a sugar residue, and n is between 1.1 and 2, and formula (II) is given as:

$$R_1O-(CH_2CH_2O)_a-(\underset{\displaystyle CH_3}{\underset{|}{CH}}-CH_2O)_b(CH_2CH_2O)_c-H \qquad (II)$$

in which:

R1 is a linear or branched alkyl radical consisting essentially of 6 to 14 carbon atoms, a, b and c, which may be identical or different, are integers between 1 and 10.

8. The composition of claim 7, wherein R1 is a linear or branched alkyl radical consisting essentially of 8 to 10 carbon atoms.

9. A diluted ready-to-use anti-foaming composition consisting essentially of:

from 0.004% to 10% by weight of one or various compounds of formula (I); and from 0.004% to 10% by weight of one or of a mixture of defoaming non-ionic surfactant of formula (II), wherein the weight ratio between the compound of formula (I) and the non-ionic defoaming surfactant of formula (II) is approximately 1, formula (I) is given as:

$$R(O)Z_n \qquad (I)$$

in which:

R represents a 2-ethyl hexyl radical,

Z is a sugar residue, and n is between 1.1 and 2, and formula (II) is given as:

$$R_1O-(CH_2CH_2O)_a-(\underset{\displaystyle CH_3}{\underset{|}{CH}}-CH_2O)_b(CH_2CH_2O)_c-H \qquad (II)$$

in which:

R1 is a linear or branched alkyl radical consisting essentially of 6 to 14 carbon atoms, a, b and c, which may be identical or different, are integers between 1 and 10.

10. The composition of claim 9, wherein R1 is a linear or branched alkyl radical consisting essentially of 8 to 10 carbon atoms.

* * * * *